(12) United States Patent
Shimizu et al.

(10) Patent No.: US 10,532,945 B2
(45) Date of Patent: Jan. 14, 2020

(54) ANTIFOULING MATTED OBJECT

(71) Applicant: TOTO LTD., Kitakyushu-Shi, Fukuoka (JP)

(72) Inventors: Satoshi Shimizu, Kitakyushu (JP); Yukika Yamazawa, Kitakyushu (JP)

(73) Assignee: TOTO LTD., Fukuoka (JP)

( * ) Notice: Subject to any disclaimer, the term of this patent is extended or adjusted under 35 U.S.C. 154(b) by 0 days.

(21) Appl. No.: 15/846,594

(22) Filed: Dec. 19, 2017

(65) Prior Publication Data
US 2018/0179102 A1    Jun. 28, 2018

(30) Foreign Application Priority Data
Dec. 22, 2016 (JP) .................................. 2016-249836

(51) Int. Cl.
| | | |
|---|---|---|
| *C03C 8/00* | (2006.01) | |
| *C23D 5/02* | (2006.01) | |
| *C04B 41/00* | (2006.01) | |
| *C04B 41/50* | (2006.01) | |
| *C04B 41/86* | (2006.01) | |
| *C04B 111/20* | (2006.01) | |

(52) U.S. Cl.
CPC .............. *C03C 8/00* (2013.01); *C04B 41/009* (2013.01); *C04B 41/5022* (2013.01); *C04B 41/86* (2013.01); *C23D 5/02* (2013.01); *C03C 2204/08* (2013.01); *C03C 2209/00* (2013.01); *C04B 2111/20* (2013.01)

(58) Field of Classification Search
CPC .............................. C03C 8/00; C03C 2204/08
See application file for complete search history.

(56) References Cited

U.S. PATENT DOCUMENTS

2017/0113965 A1* 4/2017 Siebers ................. C03C 17/002

FOREIGN PATENT DOCUMENTS

| JP | 10102213 A | * | 4/1998 | |
| JP | 2001152367 A | * | 6/2001 | |
| JP | 2012046364 A | * | 3/2012 | |
| WO | WO-2016008752 A1 | * | 1/2016 | ........... C03C 17/002 |

* cited by examiner

*Primary Examiner* — Laura A Auer
(74) *Attorney, Agent, or Firm* — Marshall, Gerstein & Borun LLP

(57) ABSTRACT

An object of the present invention is to provide a matted object capable of achieving both a lower range of glossiness and an antifouling property. A matted object includes a substrate, and a glassy layer provided on the surface of the substrate. The surface of the glassy layer has a 60°-glossiness of 20 or less, a skewness Rsk of −0.5 or more, and a maximum height roughness Rz more than 2.5 μm and less than 5.7 μm, the skewness Rsk and the maximum height roughness Rz being specified in JIS B0601 (2001).

9 Claims, 1 Drawing Sheet

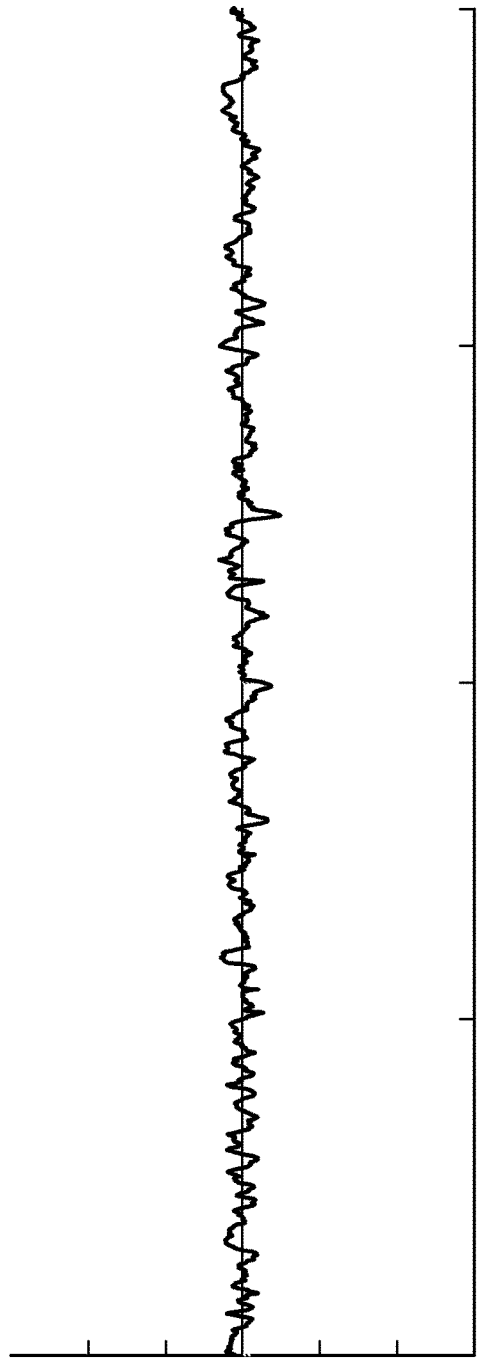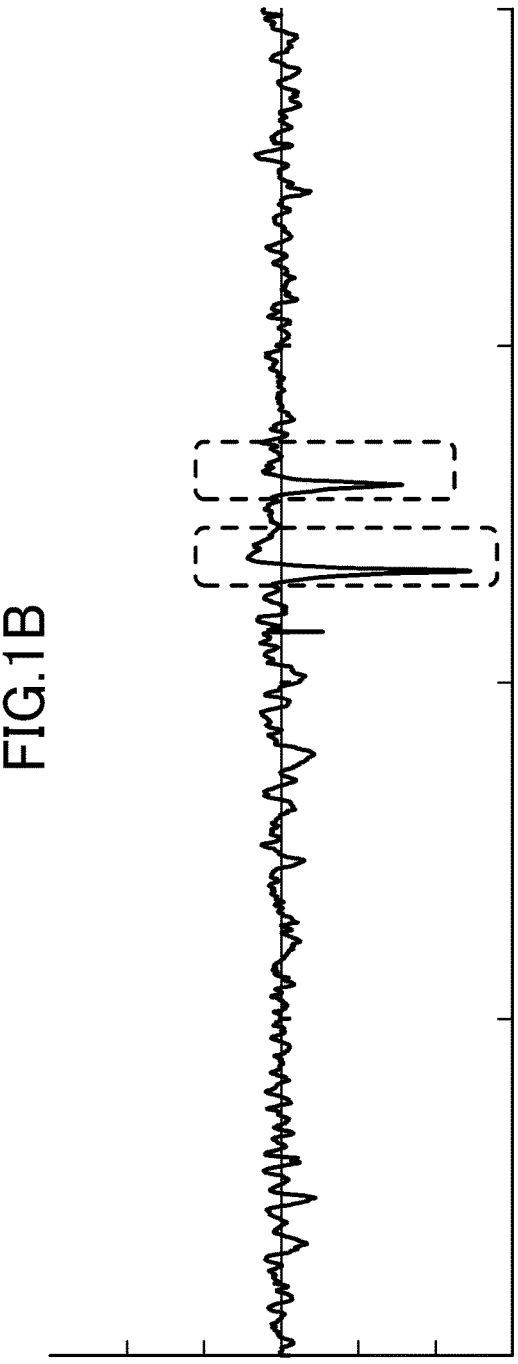

ANTIFOULING MATTED OBJECT

TECHNICAL FIELD

The present invention relates to a matted object having a surface that is matted and also has a good antifouling property.

BACKGROUND

Some bathtubs, lavatory sinks, toilet bowls, and the like have the surfaces of their substrates covered with a glassy layer of glaze, enamel, or the like in order to densify and protect their surfaces. On the other hand, there has been an increasing need for an exterior with a good design that provides a harmony in the space as a whole. Thus, there has been a demand to express a matted, soft exterior besides the glossiness of the glassy layer.

JP H06-191920 A describes a method of manufacturing a ceramic ware involving sintering the ceramic ware with its surface matted. In this method, in the sintering process, alumina in the glaze is separated and small alumina crystals are deposited on the surface of the ceramic ware to mat the surface.

JP 2012-46364 A describes a sanitary ceramic ware having an antifouling matted surface. In this sanitary ceramic ware, crystal particles are deposited by glaze sintering so as to form a matted surface having an Rc (mean height) of 0.5 μm to 2.5 μm, an Rc/RSm (mean length) more than $9 \times 10^{-3}$ and less than $16 \times 10^{-3}$, and a glossiness of 25 to 51. In this way, both an antifouling property and mat feeling are achieved.

JP H08-133870 A describes a method of manufacturing a glazed product. In this method, a glazed surface is subjected to blasting and then sintered at a temperature higher than the softening temperature of the glaze but lower than a sintering temperature. In this way, both an antifouling property and mat feeling are achieved.

JP 2010-120232 A describes a method involving performing blasting on a glazed surface, and then performing electron beam machining, laser machining, or plasma machining on the glazed surface to smoothen its sharp asperities to impart an antifouling property to the glazed surface.

SUMMARY

As mentioned above, to obtain a matted surface, methods have been employed which involve providing a surface with asperities so that light will be scattered on the surface, for example. A problem, however, is that dirt enters the recessed portions of the asperities and is difficult to be removed depending on the profile of the asperities. Moreover, a matted surface having a 60°-glossiness of 20 or less while ensuring an antifouling property has not yet been developed. An object of the present invention is to provide a matted object capable of achieving both a lower range of glossiness and an antifouling property.

The present inventors have discovered that both a matted exterior with a 60°-glossiness of 20 or less and high dirt removability can be achieved when Rsk of the surface of a glassy layer is a predetermined value or more and Rz of the surface of the glassy layer is within a predetermined range. Specifically, the present invention provides a matted object including a substrate and a glassy layer provided on a surface of the substrate, in which a surface of the glassy layer has a 60°-glossiness of 20 or less, a skewness Rsk of −0.5 or more, and a maximum height roughness Rz more than 2.5 μm and less than 5.7 μm, the skewness Rsk and the maximum height roughness Rz being specified in JIS B0601 (2001).

According to the present invention, a matted object having both a matted exterior with a 60°-glossiness of 20 or less and high dirt removability can be provided.

BRIEF DESCRIPTION OF THE DRAWINGS

FIG. 1A and FIG. 1B show examples of surface profiles obtained by measuring the sample of Example 1.

DETAILED DESCRIPTION OF EMBODIMENTS

A matted object of the present invention includes a substrate and a glassy layer provided on the surface of the substrate. The substrate used in the present invention is not particularly limited but includes ceramic, metal, and the like.

The 60°-glossiness of the surface of the glassy layer provided on the surface of the substrate is 20 or less. Also, skewness Rsk of the surface of the glassy layer provided on the surface of the substrate is −0.5 or more and preferably 0.1 or less, the skewness Rsk being specified in JIS B0601 (2001). Also, maximum height roughness Rz of the surface of the glassy layer provided on the surface of the substrate is more than 2.5 μm and less than 5.7 μm, preferably 3.0 μm or more, preferably 4.8 μm or less, and more preferably 3.0 μm to 4.8 μm, the maximum height roughness Rz being specified in JIS B0601 (2001). With a surface having such properties, it is possible to provide an object that is matted but is resistant to adhesion of dirt and also capable of letting adhering dirt be easily removed.

Also, the ratio (RC/RSm) of the mean height of roughness profile elements (Rc) to the mean length of roughness profile elements (RSm) of the surface of the glassy layer provided on the surface of the substrate is preferably at least $20 \times 10^{-3}$ and not more than $33 \times 10^{-3}$, the mean height of roughness profile elements (Rc) and the mean length of roughness profile elements (RSm) each being specified in JIS B0601 (2001).

The glassy layer is provided by coating the surface of the substrate with glaze. A glaze layer as an intermediate layer may be further provided on the surface of the substrate. The composition of the glaze, used to form the glassy layer, is not particularly limited. A mixture of particles of natural minerals such as silica sand, feldspar, and limestone, a pigment such as a cobalt compound or an iron compound, an opalizer such as zirconium silicate or tin oxide, and the like are typically used as the materials of the glaze. The glassy layer can be obtained by melting the materials of the glaze at high temperature and then quenching the melt to vitrify it. In the present invention, a preferable composition of the glaze is, for example, 10 wt % to 30 wt % of feldspar, 15 wt % to 40 wt % of silica sand, 10 wt % to 25 wt % of calcium carbonate, 10 wt % or less of corundum, talc, dolomite, and zinc oxide individually, and 15 wt % or less of the opalizer and the pigment together.

The matted object of the present invention can be manufactured by the following method, for example. Specifically, first, a substrate is prepared. In a case where the substrate is ceramic, for example, ceramic body slip containing materials such as silica sand, feldspar, and clay is molded into a desired shape by slip casting utilizing water-absorbing molds to obtain a ceramic green body. Then, the surface of the dried green body is coated with the materials of the glaze by a common method such as spray coating, dip coating, spin coating, or roll coating. Thereafter, the green body coated with the materials of the glaze is sintered. The sintering temperature is preferably at least 1,000° C. and not more than 1,300° C., at which the ceramic body is sintered and the glaze is softened. Further, the surface of the glassy layer on the resultant green body is subjected to wet blasting or the like, so that the surface profile defined earlier is obtained. In the wet blasting, the surface of the glassy layer can be adjusted into a predetermined surface profile by jetting a mixture of water, an abrasive material, and compressed air together onto the surface of the glassy layer.

In a case where the substrate is metal, for example, a metallic surface that has been subjected to pretreatment such as degreasing or washing is coated with the materials of the glaze by a common method such as spray coating, dip coating, spin coating, or roll coating and then sintered. The sintering temperature is preferably at least 750° C. and not more than 850° C., for example.

The matted object of the present invention may have a part which is not subjected to the treatment for obtaining the above-defined surface profile in some areas such as areas where dirt does not adhere so much. The matted object of the present invention may also have a pattern formed by glossy portions and matted portions.

EXAMPLES

The present invention will be described more specifically with reference to the following examples. Note that the present invention is not limited to these examples.
1. Sample Preparation
1-1 Blasting: Examples 1 to 6, 9, 10, 13, and 16 to 18
Composition of Glaze before Blasting

TABLE 1

|  | $SiO_2$ | $Al_2O_3$ | CaO | MgO | ZnO | $K_2O$ | $Na_2O$ |
|---|---|---|---|---|---|---|---|
| Examples 1 to 6, 9, 10, 13, and 16 to 18 | 67.5 | 10.3 | 11.7 | 1.3 | 5.8 | 2.2 | 1.2 |

2 kg of natural mineral particles with the composition in Table 1, 1 kg of water, and 4 kg of spherical stones were placed in a ceramic pot having a capacity of 6 liters and pulverized using a ball mill (ball diameter: 50 mm) for approximately 24 hours to obtain a glaze slurry. Thereafter, a 70×70-mm plate-shaped test piece was prepared using a sanitary ceramic ware body slip prepared using silica sand, feldspar, clay and the like as materials. This plate-shaped test piece was coated with the glaze to a thickness of 0.5 mm by spray coating using a wet-spray method and was then sintered at 1100 to 1200° C. to obtain a substrate.

A commercially available wet blasting apparatus was used on the above substrate to adjust the surface profile of the substrate. In the wet blasting, the surface of the substrate can be adjusted into a predetermined surface profile by jetting a mixture of water, an abrasive material, and compressed air together onto the surface of the substrate. The surface of the substrate was adjusted into the desired surface profile by using aspherical alumina particles as the abrasive material and appropriately selecting an abrasive-material average particle diameter (particle diameter range: 10 μm to 100 μm), compressed-air supply pressure, jetting distance, jetting angle, and jetting duration.

1-2 Glaze: Examples 7, 8, 11, 12, 14, 15, and 19 to 23

TABLE 2

|  | $SiO_2$ | $Al_2O_3$ | CaO | MgO | ZnO | $K_2O$ | $Na_2O$ |
|---|---|---|---|---|---|---|---|
| Example 7 | 59.1 | 8.7 | 15.2 | 9.2 | 4.8 | 2.3 | 0.7 |
| Example 8 | 58.1 | 8.7 | 15.8 | 9.5 | 4.9 | 2.6 | 0.7 |
| Example 11 | 63.2 | 12.5 | 10.7 | 4.6 | 4.9 | 3.4 | 0.7 |
| Example 12 | 67.0 | 6.8 | 12.2 | 7.3 | 3.8 | 2.2 | 0.7 |
| Example 14 | 60.1 | 8.7 | 14.8 | 8.8 | 4.6 | 2.3 | 0.7 |
| Example 15 | 65.1 | 8.7 | 12.1 | 7.3 | 3.8 | 2.3 | 0.7 |
| Example 19 | 64.1 | 9.7 | 12.1 | 7.3 | 3.8 | 2.3 | 0.7 |
| Example 20 | 62.1 | 11.7 | 12.1 | 7.3 | 3.8 | 2.3 | 0.7 |
| Example 21 | 58.0 | 18.3 | 10.4 | 4.5 | 4.8 | 3.3 | 0.7 |
| Example 22 | 62.1 | 8.7 | 13.7 | 8.2 | 4.3 | 2.3 | 0.7 |
| Example 23 | 63.1 | 10.7 | 12.1 | 7.3 | 3.8 | 2.3 | 0.7 |

2 kg of natural mineral particles with a composition in Table 2, 1 kg of water, and 4 kg of spherical stones were placed in a ceramic pot having a capacity of 6 liters and pulverized using a ball mill (ball diameter: 50 mm) for approximately 24 hours to obtain a glaze slurry. Thereafter, a 70×70-mm plate-shaped test piece was prepared using a sanitary ceramic ware body slip prepared using silica sand, feldspar, clay and the like as materials. This plate-shaped test piece was coated with the glaze to a thickness of 0.5 mm by spray coating using a wet-spray method and was then sintered at 1100 to 1200° C. to obtain a sample. Examples 7, 8, 11, 12, 14, 15, and 20 to 23 of sanitary ceramic wares were obtained in this manner.

1-3 Blasting: Examples 24 and 25

A commercially available wet blasting apparatus was used on two kinds of commercially available sanitary ceramic wares to adjust the surface profile of the substrate. In the wet blasting, the surface of the substrate can be adjusted into a predetermined surface profile by jetting a mixture of water, an abrasive material, and compressed air together onto the surface of the substrate. The surface of the substrate was adjusted into the desired surface profile by using aspherical alumina particles as the abrasive material and appropriately selecting an abrasive-material average particle diameter (particle diameter range: 10 μm to 100 μm), compressed-air supply pressure, jetting distance, jetting angle, and jetting duration.

2. Evaluation Method
2-1 Measurement of Surface Profile (Rsk, Rz, RSm, and Rc)

The surface profile of the samples of examples 1 to 25 was measured using a stylus surface roughness measurement apparatus (SV-624 manufactured by Mitsutoyo Corporation) complying with JIS B0601 (1996) or a laser microscope LEXT OLS4000 (manufactured by Olympus Corporation) complying with JIS B0601 (2001) based on definitions and representation in JIS B0601 (2001). Regarding the measurement conditions of the stylus surface roughness measurement apparatus, an evaluation length of 4 mm and a cutoff value λc of 0.8 mm were selected, line roughness was measured in a total of 10 spots, and the average of these values were employed as the value of a roughness parameter of the sample. Regarding the observation conditions of the laser microscope, a high accuracy mode with 430× magnification (pitch: 0.2 μm) was selected, seven images were captured each of which was a 640×640-μm image captured from a single field of view, and an image obtained by combining them by using an image joining function was evaluated. Regarding the conditions of the evaluation, an evaluation length of 4 mm and a cutoff value λc of 0.8 mm were selected, line roughness was measured in a total of 10 spots on the combined image, and the average of these values were employed as the value of a roughness parameter of the sample.

FIGS. 1A and 1B show an example of a surface profile obtained by measuring the sample of Example 1 with a stylus surface roughness measurement apparatus (SV-624 manufactured by Mitsutoyo Corporation). In FIG. 1B, areas surrounded by a dotted line correspond to areas having pores in the glassy layer. In the present invention, a surface profile is measured in areas other than such areas having pores. Specifically, the value of a roughness parameter is calculated using a profile which does not have areas having pores, like FIG. 1A.

2-2 Measurement of Glossiness

The 60°-glossiness of the samples of examples 1 to 25 was measured using a glossmeter (GM-268plus manufactured by KONICA MINOLTA, INC.) based on JIS Z8741. As an index of mat appearance, a 60°-glossiness of 20 or less was defined as acceptable.

2-3 Evaluation of Antifouling Property

The antifouling property of the surfaces of the samples of examples 1 to 25 was evaluated by the following method. A color difference meter SPECTROPHOTOMETER CM-2600d (manufactured by KONICA MINOLTA, INC.) was used. The conditions of the measurement were set to use the following: the color system: L*a*b*, mask/gloss: S/I+E, the UV setting: UV 100%, the light source: D65, the angle of view for observation: 10 degrees, and representation: absolute color difference value. The value of a* (the average of the values of three measurements on the same spot) presented by the specular component include (SCI) method, which is a method of measuring light including specularly reflected light, was used.

(1) a* of the sample surface was measured with the color difference meter, and that value was set as a0*. Meanwhile, in the measurement of a*, a white mask having a width of 5 mm was attached in the shape of a line to prevent variation in measurement due to blur. The same applies below as well.

(2) A line having a width of 3 mm was drawn on the sample with a red oil pastel, a* on the line was measured with the color difference meter, and that value was set as a1*.

(3) The line was wiped back and forth 30 times using a commercially available toilet cleaning sheet (product name: Toire Kuikkuru) while applying a load of 25 g/cm² perpendicularly to the line.

(4) The color of the oil pastel line on the sample after the repeated wiping was measured with the color difference meter, and that value was set as a2*.

(5) The dirt removability was calculated from the following equation.

Dirt Removability (%)=(a1*−a2*)/(a1*−a0*)

A dirt removability of 80% or higher can be considered a good removability.

TABLE 3

| | Substrate | Process | Glossiness | Dirt Removability [%] | Rsk | Rz [μm] | Rc [μm] | RSm [μm] | Rc/RSm [μm] |
|---|---|---|---|---|---|---|---|---|---|
| Example 1 | Ceramic | Blasting | 13 | 93 | 0.1 | 3.0 | 1.6 | 80 | 20 |
| Example 2 | Ceramic | Blasting | 17 | 89 | 0.0 | 4.2 | 2.3 | 88 | 26 |
| Example 3 | Ceramic | Blasting | 5 | 83 | 0.0 | 4.8 | 2.5 | 76 | 33 |
| Example 4 | Ceramic | Blasting | 7 | 81 | −0.3 | 4.1 | 2.1 | 78 | 27 |
| Example 5 | Ceramic | Blasting | 11 | 85 | −0.3 | 3.7 | 2.2 | 85 | 26 |
| Example 6 | Ceramic | Blasting | 12 | 83 | −0.5 | 3.5 | 2.0 | 84 | 24 |
| Example 7 | Ceramic | Glaze | 80 | 95 | 0.1 | 1.5 | 0.9 | 373 | 3 |
| Example 8 | Ceramic | Glaze | 82 | 98 | 0.1 | 0.6 | 0.4 | 331 | 1 |
| Example 9 | Ceramic | Blasting | 92 | 100 | 0.0 | 0.4 | 0.2 | 208 | 1 |
| Example 10 | Ceramic | Blasting | 79 | 99 | −0.1 | 0.5 | 0.3 | 241 | 1 |
| Example 11 | Ceramic | Glaze | 38 | 99 | −0.2 | 2.5 | 1.2 | 124 | 10 |
| Example 12 | Ceramic | Glaze | 51 | 97 | −0.2 | 2.0 | 1.0 | 170 | 6 |
| Example 13 | Ceramic | Blasting | 7 | 75 | −0.1 | 5.7 | 2.6 | 71 | 36 |
| Example 14 | Ceramic | Glaze | 39 | 94 | −0.9 | 2.7 | 1.4 | 151 | 9 |
| Example 15 | Ceramic | Glaze | 25 | 95 | −0.8 | 4.0 | 2.1 | 134 | 15 |
| Example 16 | Ceramic | Blasting | 33 | 80 | −1.1 | 1.4 | 0.7 | 99 | 7 |
| Example 17 | Ceramic | Blasting | 31 | 82 | −1.6 | 2.4 | 1.2 | 78 | 15 |
| Example 18 | Ceramic | Blasting | 45 | 90 | −2.3 | 1.5 | 0.7 | 121 | 6 |
| Example 19 | Ceramic | Glaze | 16 | 72 | −0.6 | 5.7 | 3.2 | 137 | 23 |
| Example 20 | Ceramic | Glaze | 8 | 29 | −0.6 | 7.8 | 4.0 | 90 | 45 |
| Example 21 | Ceramic | Glaze | 8 | 44 | −0.8 | 8.2 | 4.2 | 102 | 41 |
| Example 22 | Ceramic | Glaze | 6 | 11 | −0.9 | 7.6 | 3.7 | 97 | 39 |
| Example 23 | Ceramic | Glaze | 11 | 58 | −0.9 | 6.9 | 3.6 | 130 | 28 |
| Example 24 | Ceramic | Blasting | 13 | 76 | −0.8 | 3.8 | 2.4 | 92 | 26 |
| Example 25 | Ceramic | Blasting | 11 | 90 | −0.3 | 4.7 | 2.6 | 130 | 20 |

The invention claimed is:

1. An antifouling matted object comprising:
a substrate; and
a glassy layer provided on a surface of the substrate,
wherein the substrate is ceramic; a surface of the glassy layer has a 60°-glossiness of 20 or less, a skewness Rsk of −0.5 or more and 0.1 or less, and a maximum height roughness Rz more than 2.5 μm and less than 5.7 μm, the skewness Rsk and the maximum height roughness Rz being specified in JIS B0601 (2001); and a ratio (Rc/RSm) of a mean height of roughness profile elements (Rc) to a mean length of roughness profile elements (RSm) is at least $20 \times 10^{-3}$ and not more than $33 \times 10^{-3}$.

2. The matted object according to claim 1, wherein the Rz is 3.0 μm or more.

3. The matted object according to claim 1, wherein the Rz is 4.8 μm or less.

4. The matted object according to claim 2, wherein the Rz is 4.8 μm or less.

5. The matted object according to claim 2, wherein a ratio (Rc/RSm) of a mean height of roughness profile elements (Rc) to a mean length of roughness profile elements (RSm) is at least $20\times10^{-3}$ and not more than $33\times10^{-3}$.

6. The matted object according to claim 3, wherein a ratio (Rc/RSm) of a mean height of roughness profile elements (Rc) to a mean length of roughness profile elements (RSm) is at least $20\times10^{-3}$ and not more than $33\times10^{-3}$.

7. The matted object according to claim 4, wherein a ratio (Rc/RSm) of a mean height of roughness profile elements (Rc) to a mean length of roughness profile elements (RSm) is at least $20\times10^{-3}$ and not more than $33\times10^{-3}$.

8. The matted object according to claim 1, wherein a ratio (Rc/RSm) of a mean height of roughness profile elements (Rc) to a mean length of roughness profile elements (RSm) is at least $20\times10^{-3}$ and not more than $33\times10^{-3}$.

9. A matted object comprising:
a substrate; and
a glassy layer provided on a surface of the substrate, wherein a surface of the glassy layer has a 60°-glossiness of 20 or less, a skewness Rsk of −0.5 or more and 0.1 or less, and a maximum height roughness Rz more than 2.5 μm and less than 5.7 μm, the skewness Rsk and the maximum height roughness Rz being specified in JIS B0601 (2001); a ratio (Rc/RSm) of a mean height of roughness profile elements (Rc) to a mean length of roughness profile elements (RSm) is at least $20\times10^{-3}$ and not more than $33\times10^{-3}$; and a dirt removability is 80% or higher, the dirt removability being obtained by the following method:

(1) a* of the sample surface is measured with a color difference meter, and that value is set as a0*; in the measurement of a*, a white mask having a width of 5 mm is attached in the shape of a line to prevent variation in measurement due to blur; and the same applies below as well;

(2) a line having a width of 3 mm is drawn on the sample with a red oil pastel, a* on the line is measured with the color difference meter, and that value is set as a1*;

(3) the line is wiped back and forth 30 times using a commercially available toilet cleaning sheet while applying a load of 25 g/cm² perpendicularly to the line;

(4) the color of the oil pastel line on the sample after the repeated wiping is measured with the color difference meter, and that value is set as a2*; and (5) the dirt removability is calculated from the following equation Dirt Removability (%)=(a1*−a2*)/(a1*−a0*).

* * * * *